Jan. 12, 1954
M. H. ANDERSON
2,665,824
COMBINED HOLDER AND DISPENSER MEANS FOR
CONTAINERS FOR SEMIFLUIDS AND FLUIDS
Filed Jan. 27, 1950
2 Sheets-Sheet 2
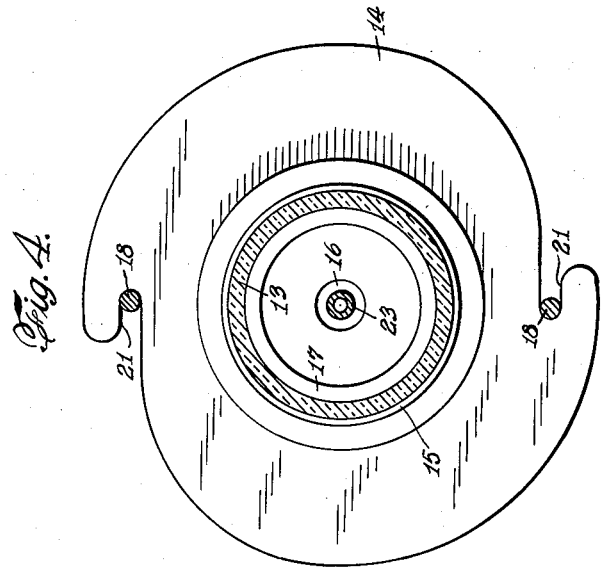
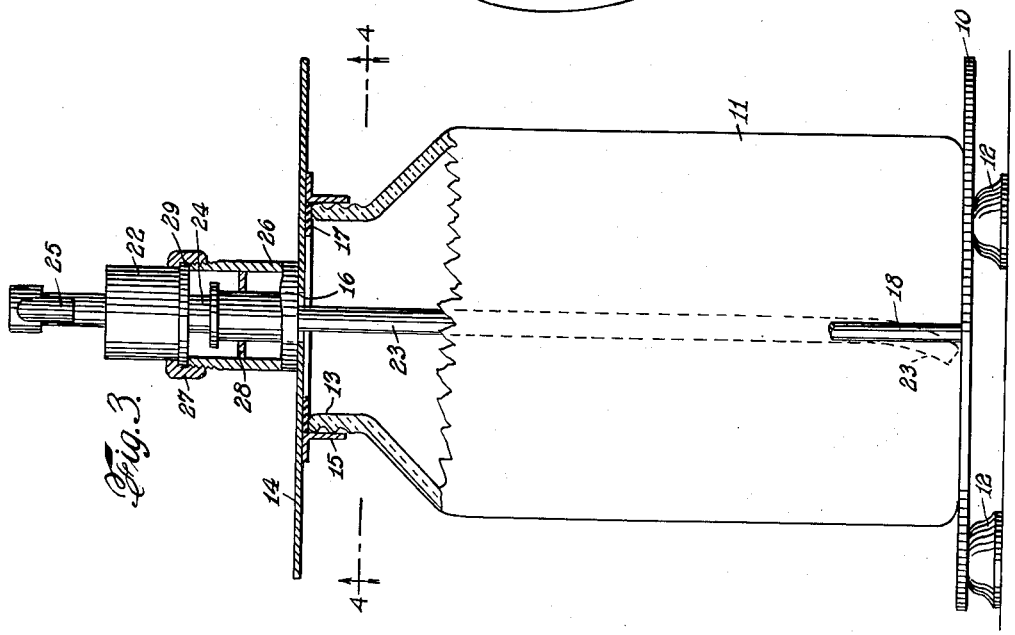
INVENTOR.
MARIE HELEN ANDERSON
BY
*Fred V. Schwetz*
ATTORNEY.

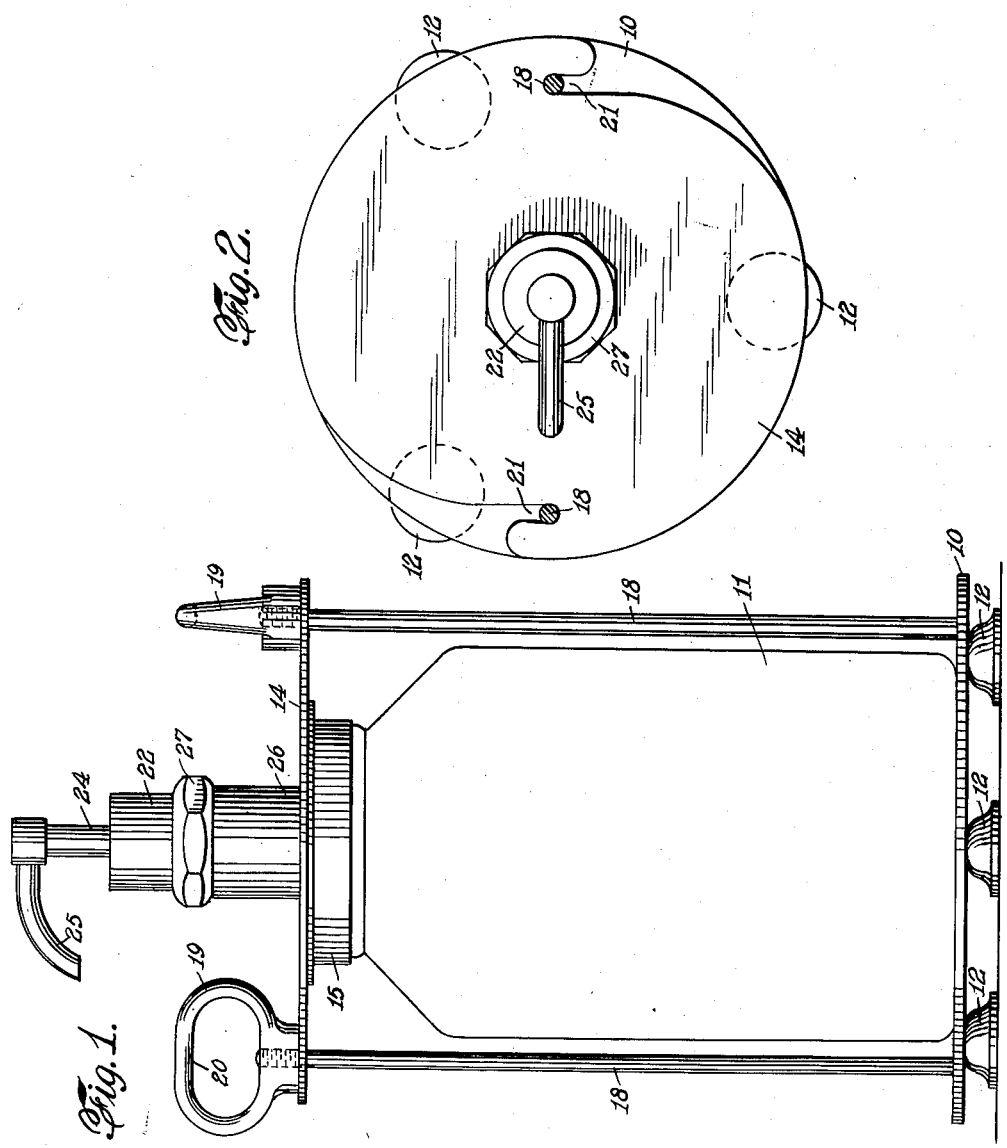

Patented Jan. 12, 1954

2,665,824

UNITED STATES PATENT OFFICE 2,665,824

COMBINED HOLDER AND DISPENSER MEANS FOR CONTAINERS FOR SEMIFLUIDS AND FLUIDS

Marie Helen Anderson, Brooklyn, N. Y.

Application January 27, 1950, Serial No. 140,845

2 Claims. (Cl. 222—183)

The invention relates to a holder or rack for a portable container, for example, a glass jar or the like designed to retain a semi-fluid edible mixture such as mustard, catsup, mayonnaise, etc., to be dispensed upon a more or less substantial scale but in relatively small servings for immediate consumption. I am aware that manually operable pumping mechanism has been associated with a container for this purpose and that provision has been made for supporting a container or jar in various positions for discharge of its contents.

However, the present invention is concerned more especially with a combined support and dispensing appliance, and it has for an object the provision of a stable supporting rack for a container together with a dispensing unit, whereby a desired amount of the container contents may be withdrawn by operation of the pump with one hand only, the novel rack-container combination insuring adequate rigidity so that the other hand remains free for manipulation, for example, of the food brought thereto to receive the dispensed mixture.

A further object of the invention is to provide a rack which will admit of viewing at all times the contents of the retained container, the latter remaining in said rack until it becomes empty.

A still further object of the invention is to provide a rack-dispenser combination of the nature set forth whereby the container is readily associated with the dispenser and is as readily replaceable.

The invention has for an object, also, to provide container-retaining means which will further serve, when the container has been properly installed, to afford means for the ready transportation from place to place of the complete dispensing combination without possibility of spillage.

In carrying out the invention, a base plate such as a circular metal disk is provided and upon which the container seats, said plate having over its under surface rubber suction cups whereby an installed container may be securely anchored in the desired location through its supporting rack. Posts extend upwardly from the upper surface of said disk to confine the container in cooperation with a second and similar upper plate removably secured over the upper ends of the posts. These posts are threaded to receive respective thumb nuts to clamp said upper plate upon the mouth of the container and said nuts are constructed to afford means whereby they may be grasped for manual transportation of the combination. The upper plate is preferably provided to this end with a locating sleeve extending from its under surface and designed to fit over the neck of the container with, preferably, an annular gasket interposed to seal the container. The plate may overhang the container and afford a shelf at the top; and, furthermore, it is centrally perforated to admit the dispensing appliance outlet tube. This appliance is then mounted concentrically with the upper plate and is retained thereto through a flange of said appliance engaging with a cap nut threaded over a housing for the dispensing appliance and integral with and directed upwardly from the upper surface of the said upper plate.

The nature of the invention, however, will best be understood when described in connection with the accompanying drawings, in which:

Fig. 1 is a front elevation of the novel rack and dispensing container combination; and Fig. 2 is a plan thereof.

Fig. 3 is a vertical section, with portions shown in elevation.

Fig. 4 is a transverse sectional view taken on the line 4—4, Fig. 3, and looking in the direction of the arrows.

Referring to the drawings, 10 designates a base plate, preferably circular, for supporting the container 11 which is generally of the nature of a transparent wide-mouthed bottle and of a capacity to suit the requirements. The said base plate is preferably provided over its under surface with a plurality of suction caps 12 to anchor the novel holder-dispenser unit at any desired location. The mouth 13 of the container is covered with a centrally perforated plate or lid member 14 similar to the plate 10, the two plates cooperating in the manner hereinafter set forth to afford a retaining rack for the said container. It is also preferred to make the diameter of the plate 14 large enough to cause said plate to overhang the container and afford substantial shelf area at the top of the container; and the under surface may be provided with a depending sleeve 15 for locating the container coaxially with the plate 14 and a central perforation 16 thereof. To seal substantially the container 11, a rubber gasket 17 may be interposed between the under face of the plate 14 and the rim of the container.

To assemble the rack for holding the container in position, a pair of posts 18 extend upwardly from the upper surface of plate 10 and are spaced apart, preferably diametrically for convenient introduction of the said container. The upper ends of said posts are threaded to receive corresponding wing nuts 19 having each a digital opening 20. Plate 14 is provided with oppositely disposed and inwardly directed peripheral slots 21 which are preferably arcuate to afford a "twist" lock for said plate in cooperation with the posts, so that it is readily separable in disassembling the rack as for replacement of a retained container or cleaning of the dispensing mechanism 22.

This mechanism may be of any of the well known types and includes a tube 23 adapted to extend into the interior of container 11 and a manually depressible hollow plunger element 24 having a spout 25 for discharge of the contents of container 11 in controllable quantities as supplied through the tube 23. The said mechanism is designed to be associated removably with the rack, for example, by means including a housing 26 integral with the top plate 14 and extending upwardly from its upper surface, together with a cap nut 27 adapted to screw over the outer threaded end of said housing. The dispensing mechanism to this end is designed to be held against the top of plate 14 and is coaxially positioned with reference to the perforation 16 as well as to the container by a spider 28 of the mechanism. A flange 29 at the upper portion of the dispensing unit is adapted for engagement with the cap nut 27 to cause the said unit to be held thereby firmly to the top plate. The entire dispensing unit, rack and container then constitute a substantial and rigid assembly from which the container contents are dispensable in servings corresponding to the pump design; and the said assembly is readily portable as a whole by inserting a finger or fingers into one or both of the digital openings 20, the suction cups 12 releasing upon sufficient pull being exerted, as is well understood.

To disassemble the novel combination, the wing nuts 19 are loosened to afford the plate 14 a slight rotation to free the posts 18 from their engagement with plate 14. After unclamping the dispensing mechanism by unscrewing the clamping nut from the housing, the said mechanism is bodily lifted out of the container and housing, whereupon the container is readily removable with the top plate by withdrawing it from between the posts. All parts thus become readily available for inspection and/or cleaning.

I claim:
1. A container rack of the nature set forth, comprising a circular base plate; a pair of posts rigidly secured thereto at diametrically opposite points substantially at its circumference and extending upwardly from its upper surface, the posts being threaded at their respective free ends and affording shoulders thereat, said posts serving as means to receive and to seat between them on the base a container; a perforated circular lid member for the container having arcuate slots inwardly directed in the plane of said lid member from its periphery, open in opposite directions and adapted to fit over the respective threaded ends of the posts for effecting engagement of the lid with the container; a pair of internally threaded wing nuts adapted to screw upon the respective threaded post ends to afford with the slots a twist lock for the lid member to clamp the same to the corresponding shoulders of said posts; a pump-retaining cylindrical sleeve fixed to the lid member coaxially with its perforation and projecting upwardly from its upper surface; and a pump unit including means to hold said unit removably to the upper end of the sleeve, said pump unit being provided also with a tube extending through the bottom of the sleeve to extend through the lid member perforation into the bottom of the container for dispensing through said tube the contents thereof above said lid member.

2. A container rack according to claim 1, wherein the wing nuts are each provided with a digital opening for manual transport of the rack with a retained container.

MARIE HELEN ANDERSON.

References Cited in the file of this patent
UNITED STATES PATENTS

| Number | Name | Date |
|---|---|---|
| 145,329 | Beissel | Dec. 9, 1873 |
| 1,158,247 | Lindblom | Oct. 26, 1915 |
| 1,211,336 | Nichols | Jan. 2, 1917 |
| 1,495,505 | Beaman | May 27, 1924 |
| 1,817,794 | Anderson et al. | Aug. 4, 1931 |
| 1,939,980 | Hillyard | Dec. 19, 1933 |
| 2,185,897 | Krause et al. | Jan. 2, 1940 |
| 2,264,215 | McClish | Nov. 25, 1941 |
| 2,463,664 | Watson | Mar. 8, 1949 |